April 2, 1940. M. K. TRAVER 2,195,526
ILLUMINATED MIRROR
Filed Feb. 2, 1937
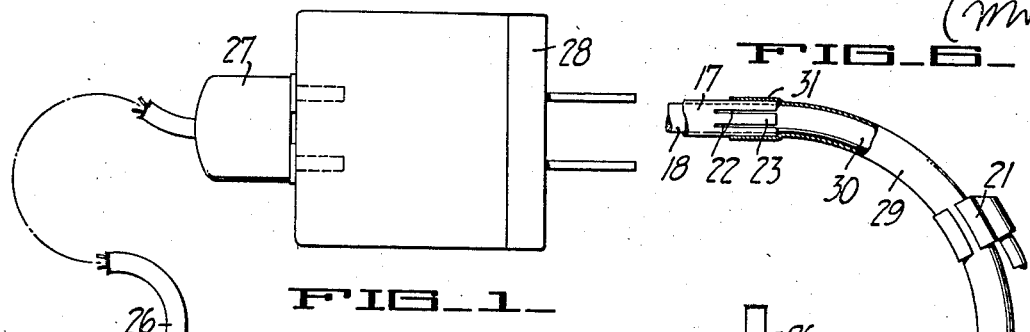
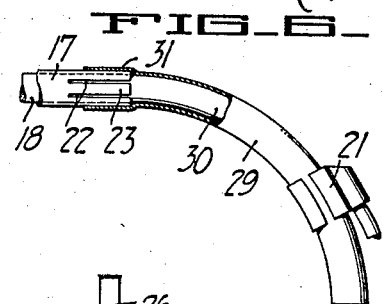
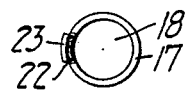
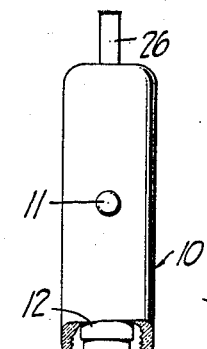
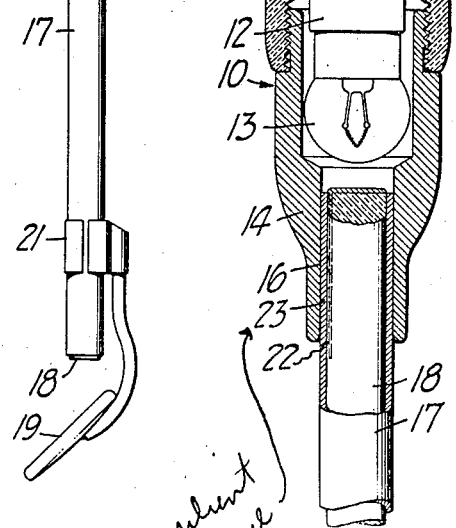
INVENTOR.
Merrick K. Traver
BY Paul D. Flehr
ATTORNEY.

Patented Apr. 2, 1940

2,195,526

UNITED STATES PATENT OFFICE 2,195,526

ILLUMINATED MIRROR

Merrick K. Traver, San Francisco, Calif., assignor, by direct and mesne assignments, to Joseph B. Smith, San Francisco, Calif.

Application February 2, 1937, Serial No. 123,558

1 Claim. (Cl. 240—2.18)

This invention relates generally to devices such as are used by the medical profession or by dentists for the purpose of exploring or observing portions of the mouth or throat.

It is an object of the invention to provide a device of the above character which will have a relatively intense source of illumination, but which will be relatively compact and convenient to operate.

Another object is to provide a device of this character which can be readily taken apart for cleaning and sterilizing, and which will be capable of withstanding relatively rough usage without breakage.

Further objects of the invention will appear from the following description in which the preferred embodiment of the invention has been set forth in detail, in conjunction with the accompanying drawing.

Referring to the drawing:

Fig. 1 is a side elevational view of a device incorporating the invention.

Fig. 2 is a cross sectional view taken along the line 2—2 of Fig. 1.

Fig. 3 is a fragmentary side view of one end portion of the metallic tube surrounding the light transparent rod.

Fig. 4 is an end view of the tube as shown in Fig. 3.

Fig. 5 is an exploded view partly in cross section of the device as shown in Fig. 1.

Fig. 6 is a detailed view indicating a modified form of the device.

The device illustrated in the drawing consists generally of a handle 10, made of some suitable material, such as a molded phenolic condensate product. This handle serves to house a suitable electrical switch 11, and is also provided with a lamp socket 12, for the small lamp 13. Attached to the handle point 10 there is a metal ferrule 14, which is provided with a substantially cylindrical bore or socket 16 directly in alignment with the electrical lamp 13.

An open ended metal tube 17 extends from the handle 10, and has its one end slidably fitted within the socket or bore 16. Removably fitted within this tube 17, there is a rod 18 of transparent glass-like material, such as "pyrex" glass or quartz. This rod is of substantially the same length as the length of the tube 17, and as will be presently explained, serves to transmit light from the lamp 13. The free end of tube 17 serves to carry a small mirror 19. To facilitate removal of this mirror from the tube and to enable its adjustment, it is shown carried by a split sleeve 21, which in turn is slidably and frictionally engaged upon the tube 17.

With respect to that end of tube 17 which is fitted within socket 16, it will be noted that it is slotted as indicated at 22, to afford a resilient tongue 23. This tongue 23 is bent a slight amount, so that when tube 17 is removed from socket 16, the tongue appears as shown in Fig. 3. The principal purpose of this arrangement is to afford a means for frictionally gripping and retaining the rod 17, when the parts are properly assembled. Thus, when rod 18 is placed within tube 17, and tube 17 inserted in socket 16, tongue 23 is bent inwardly, so that it frictionally engages and retains the rod 18. Likewise the fact that the end of tube 17 is split, enables proper frictional retention of the tube within the socket 16.

My device can be electrically connected to any suitable source of current supply. For example in Fig. 1 a flexible electrical cord 26 is shown, which carries a plug 27, for its connection with a small portable step-down transformer 28. Such a transformer can be plugged into any suitable 60 cycle 110 volt current supply. Also if a house lighting current supply is not available, plug 27 can be connected to any suitable battery.

Operation of my device will be evident from the above. When current is applied to the lamp 13, light is transmitted longitudinally through the rod 18, and projected upon the mirror 19. The use of a metallic tube 17 closely surrounding the transparent rod 18, serves to greatly increase the efficiency of light transmission to the mirror, so that much better illumination can be secured, as compared to prior devices utilizing comparatively the same current consumption. Furthermore, the use of such an outer metallic tube serves to protect the rod 18, and to preclude breakage of the same. It will be noted that all parts of this assembly which may require sterilizing, can be dis-assembled in separate elements as illustrated in Fig. 4, for purpose of sterilizing the same. This is a material advantage particularly since instruments of this character must be sterilized at frequent intervals.

I claim:

In an instrument of the character described, an open ended metal tube, a handle having a socket into which one end of said tube can be fitted, an electric lamp disposed within said handle, said one end of said tube being formed to provide a resilient tongue which is forced inwardly when said tube is fitted within the socket, a rod of glass-like transparent material slidably fitted within said tube and extending substantially the entire length of the same, said rod being frictionally engaged by said tongue and a mirror secured to the other end of said tube, said mirror being positioned to receive light transmitted through said rod from said lamp.

MERRICK K. TRAVER.